US012737907B2

(12) United States Patent
Chen

(10) Patent No.: US 12,737,907 B2
(45) Date of Patent: Sep. 15, 2026

(54) IMAGE PROCESSING METHOD, ELECTRONIC DEVICE, STORAGE MEDIUM, AND PROGRAM PRODUCT

(71) Applicant: HONOR DEVICE CO., LTD., Shenzhen (CN)

(72) Inventor: Bing Chen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 475 days.

(21) Appl. No.: 18/278,739

(22) PCT Filed: Aug. 31, 2022

(86) PCT No.: PCT/CN2022/116309
§ 371 (c)(1),
(2) Date: Aug. 24, 2023

(87) PCT Pub. No.: WO2023/045724
PCT Pub. Date: Mar. 30, 2023

(65) Prior Publication Data

US 2024/0202950 A1 Jun. 20, 2024

(30) Foreign Application Priority Data

Sep. 27, 2021 (CN) .......................... 202111139841.7

(51) Int. Cl.
*G06T 7/55* (2017.01)
*G06T 7/70* (2017.01)

(52) U.S. Cl.
CPC .................. *G06T 7/55* (2017.01); *G06T 7/70* (2017.01); *G06T 2207/10028* (2013.01); *G06T 2207/20081* (2013.01)

(58) Field of Classification Search
CPC ... G06T 7/55; G06T 7/70; G06T 2207/10028; G06T 2207/20081; G06T 2207/10024;
(Continued)

(56) References Cited

U.S. PATENT DOCUMENTS 11,210,803 B2 12/2021 Ye et al.
11,238,604 B1 * 2/2022 Baig ........................ G06N 3/09
(Continued)

FOREIGN PATENT DOCUMENTS

CN 108062769 A 5/2018
CN 108416840 A 8/2018
(Continued)

OTHER PUBLICATIONS

He et al: "3D Reconstruction Algorithm Based on Sparse Laser Point—cloud and Single—frame Images", Measurement Technology. 2017,37(03),total 7 pages.

(Continued)

*Primary Examiner* — Stephen P Coleman
(74) *Attorney, Agent, or Firm* — WOMBLE BOND DICKINSON (US) LLP

(57) ABSTRACT

This application provides an image processing method, an electronic device, a storage medium, and a program product. The method includes: determining a first corrected sparse depth map and first corrected pose information corresponding to the first video frame based on the first video frame, the first estimated sparse depth map, the first estimated pose information, a second video frame, a second estimated sparse depth map and second estimated pose information corresponding to the second video frame, and a target sparse depth map that is synchronized with the first video frame and acquired by a depth camera; and determining a dense depth map corresponding to the first video frame based on the first video frame, the first corrected sparse depth map, the first corrected pose information, the second video frame, and a second corrected sparse depth map and second corrected pose information of the second video frame.

20 Claims, 7 Drawing Sheets

(58) Field of Classification Search
CPC . G06T 2207/20084; G06T 2207/20221; G06T 2207/30244; G06T 5/60; G06T 7/579; G06V 10/774
USPC .......................................................... 382/106
See application file for complete search history.

(56) References Cited

U.S. PATENT DOCUMENTS

| | | | |
|---|---|---|---|
| 2022/0122281 | A1 | 4/2022 | Song et al. |
| 2022/0180543 | A1 | 6/2022 | Ling et al. |

FOREIGN PATENT DOCUMENTS

| | | | |
|---|---|---|---|
| CN | 109087349 | A | 12/2018 |
| CN | 110992271 | A | 4/2020 |
| CN | 112330729 | A | 2/2021 |
| CN | 112819874 | A | 5/2021 |
| CN | 112927251 | A | 6/2021 |
| CN | 113344839 | A | 9/2021 |
| KR | 20190029842 | A | 3/2019 |

OTHER PUBLICATIONS

Ye Xinchen et al: "DRM-SLAM: Towards dense reconstruction of monocular SLAM with scene depth fusion", ARXIV, vol. 396, Jul. 1, 2020 (Jul. 1, 2020), pp. 76-91.

Truong Giang Khang et al: "Sequential Depth Completion With Confidence Estimation for 3D Model Reconstruction", IEEE Robotics and Automation Letters, IEEE, vol. 6, No. 2, Dec. 2020 (Dec. 8, 2020), pp. 327-334.

Vaishakh Patil et al: "Don't Forget the Past: Recurrent Depth Estimation from Monocular Video", arxiv.org, Cornell University Library, 201 Olin Library Cornell University Ithaca, NY 14853, Jan. 8, 2020 (Jan. 8, 2020), 10 pages.

* cited by examiner

IMAGE PROCESSING METHOD, ELECTRONIC DEVICE, STORAGE MEDIUM, AND PROGRAM PRODUCT

CROSS-REFERENCE TO RELATED APPLICATIONS

This application is a national stage of International Application No. PCT/CN2022/116309, filed on Aug. 31, 2022, which claims priority to Chinese Patent Application No. 202111139841.7, filed on Sep. 27, 2021. The disclosures of both of the aforementioned applications are hereby incorporated by reference in their entireties.

TECHNICAL FIELD

This application relates to the technical field of terminals, and in particular, to an image processing method, an electronic device, a storage medium, and a program product.

BACKGROUND

A depth image is a three-dimensional representation of an object, which can directly reflect a geometric shape of a visible surface of a scene. Based on the sparsity of depth information, a depth image includes a sparse depth map and a dense depth map. The dense depth map is usually used in application.

In one case, a dense depth map can be obtained by a depth camera with excellent indicators such as high resolution. That is to say, a to-be-photographed target is photographed by the depth camera, thereby obtaining a dense depth map with high resolution.

However, since the cost, resolution, and power consumption of the depth camera cannot simultaneously satisfy the commercial needs, the applicability of obtaining the dense depth map by the depth camera is relatively poor. Therefore, how to obtain a dense depth map has become a research hotspot.

SUMMARY

This application provides an image processing method, an electronic device, a storage medium, and a program product, which solve the problem that accuracy of a finally obtained depth map is low due to a limitation of accuracy of a fusion algorithm in the prior art.

To achieve the foregoing objective, this application adopts the following technical solutions.

According to a first aspect, an image processing method is provided, including:

determining a first estimated sparse depth map and first estimated pose information corresponding to a first video frame in a video frame sequence, where the video frame sequence is acquired by a mobile RGB camera;

determining a first corrected sparse depth map and first corrected pose information corresponding to the first video frame based on the first video frame, the first estimated sparse depth map, the first estimated pose information, a second video frame in the video frame sequence before the first video frame, a second estimated sparse depth map and second estimated pose information corresponding to the second video frame, and a target sparse depth map that is synchronized with the first video frame and acquired by a depth camera; and determining a dense depth map corresponding to the first video frame based on the first video frame, the first corrected sparse depth map, the first corrected pose information, the second video frame, and a second corrected sparse depth map and second corrected pose information of the second video frame.

In an example, one second video frame is provided. In another example, a plurality of second video frames are provided.

As an example of this application, the second estimated sparse depth map and the second estimated pose information corresponding to the second video frame are obtained in a manner of determining the first estimated sparse depth map and the first estimated pose information.

In an example, the second corrected sparse depth map and the second corrected pose information are obtained in a manner of determining the first corrected sparse depth map and the first corrected pose information.

Since the first corrected sparse depth map and the first corrected pose information are more accurate, the second corrected sparse depth map and the second corrected pose information are also more accurate, and the first video frame and the second video frame are captured from different angles, a depth image having accurate and dense depth information can be finally obtained. In this way, an index requirement for the depth camera is also reduced.

As an example of this application, the determining a first corrected sparse depth map and first corrected pose information corresponding to the first video frame based on the first video frame, the first estimated sparse depth map, the first estimated pose information, a second video frame in the video frame sequence before the first video frame, a second estimated sparse depth map and second estimated pose information corresponding to the second video frame, and a target sparse depth map that is synchronized with the first video frame and acquired by a depth camera includes:

inputting the first video frame, the first estimated sparse depth map, the first estimated pose information, the second video frame, the second estimated sparse depth map, the second estimated pose information, and the target sparse depth map into a first target model for processing, and outputting the first corrected sparse depth map and the first corrected pose information, where the first target model is configured to determine a corrected sparse depth map and corrected pose information corresponding to any video frame based on the any video frame, an estimated sparse depth map and estimated pose information corresponding to the any video frame, another video frame located before the any video frame, an estimated sparse depth map and estimated pose information corresponding to the another video frame, and a sparse depth map that is synchronized with the any video frame and acquired by the depth camera.

In this way, an electronic device invokes the first target model and performs fusion through the first target model, so that fusion efficiency can be improved.

As an example of this application, the method further includes:

obtaining a first sample data set, where the first sample data set includes a plurality of sets of first sample data, and each of the plurality of sets of first sample data includes a sparse depth map sample acquired by the depth camera, a video frame sample sequence acquired by the RGB camera, an estimated sparse sample depth map and estimated sample pose information corresponding to video frame samples in the video frame sample sequence, a true sparse depth map sample, and true sample pose information; and training a to-be-trained first network model based on the first sample data set to obtain the first target model.

In this way, the first network model is trained based on the first sample data set to obtain the first target model. In application, the first target model performs processing based on the first video frame, the first estimated sparse depth map, the first estimated pose information, the second video frame, the second estimated sparse depth map, the second estimated pose information, and the target sparse depth map, to determine the first corrected sparse depth map and the first corrected pose information. In this way, efficiency of determining the first corrected sparse depth map and the first corrected pose information can be improved.

As an example of this application, the determining a dense depth map corresponding to the first video frame based on the first video frame, the first corrected sparse depth map, the first corrected pose information, the second video frame, and a second corrected sparse depth map and second corrected pose information of the second video frame includes:

inputting the first video frame, the first corrected sparse depth map, the first corrected pose information, the second video frame, the second corrected sparse depth map, and the second corrected pose information into a second target model for processing, and outputting the dense depth map, where the second target model is configured to determine a dense depth map corresponding to any video frame based on the any video frame, a corrected sparse depth map and corrected pose information corresponding to the any video frame, another video frame located before the any video frame, and a corrected sparse depth map and corrected pose information corresponding to the another video frame.

In this way, the electronic device invokes the second target model, and determines the dense depth map through the second target model, so as to improve the determination efficiency.

As an example of this application, the method further includes:

obtaining a second sample data set, where the second sample data set includes a plurality of sets of second sample data, and each of the plurality of sets of second sample data includes a video frame sample sequence, a corrected sparse depth map sample and corrected pose information corresponding to each video frame sample in the video frame sample sequence, and a true dense depth map corresponding to each video frame sample; and training a to-be-trained second network model based on the second sample data set to obtain the second target model.

In this way, the second network model is trained based on the second sample data set to obtain the second target model. In application, the first target model performs processing based on the first video frame, the first corrected sparse depth map, the first corrected pose information, the second video frame, the second corrected sparse depth map, and the second corrected pose information, to determine the dense depth map. In this way, efficiency of determining the dense depth map can be improved.

As an example of this application, the first video frame is a key frame, and the second video frame is a key frame.

That is to say, the electronic device may extract key frames in the video sequence, and then determine a first estimated sparse depth map and first estimated pose information corresponding to the key frames. It is worth mentioning that in some scenarios, the video frame processing amount of the video frame sequence can be reduced by performing processing on the video frames including key content in the video frame sequence.

As an example of this application, a plurality of second video frames are provided, and the determining a first corrected sparse depth map and first corrected pose information corresponding to the first video frame based on the first video frame, the first estimated sparse depth map, the first estimated pose information, a second video frame in the video frame sequence before the first video frame, a second estimated sparse depth map and second estimated pose information corresponding to the second video frame, and a target sparse depth map that is synchronized with the first video frame and acquired by a depth camera includes:

determining the first corrected sparse depth map and the first corrected pose information based on the first video frame, the first estimated sparse depth map, the first estimated pose information, each of the plurality of second video frames, a second estimated sparse depth map and second estimated pose information corresponding to each second video frame, and the target sparse depth map.

In this way, when a plurality of second video frames are provided, it indicates that depth information of a target may be determined from more angles, that is, rich depth information may be determined, so that the finally determined first corrected sparse depth map and first corrected pose information are more accurate.

As an example of this application, the determining a dense depth map corresponding to the first video frame based on the first video frame, the first corrected sparse depth map, the first corrected pose information, the second video frame, and a second corrected sparse depth map and second corrected pose information of the second video frame includes:

determining the dense depth map based on the first video frame, the first corrected sparse depth map, the first corrected pose information, each second video frame, and a second corrected sparse depth map and second corrected pose information corresponding to each second video frame.

In this way, when a plurality of second video frames are provided, it indicates that depth information of a target may be determined from more angles, that is, rich depth information may be determined, so that a depth image having dense and accurate depth information can be determined.

According to a second aspect, an image processing apparatus is provided, including:

a first determining module, configured to determine a first estimated sparse depth map and first estimated pose information corresponding to a first video frame in a video frame sequence, where the video frame sequence is acquired by a mobile RGB camera;

a second determining module, configured to determine a first corrected sparse depth map and first corrected pose information corresponding to the first video frame based on the first video frame, the first estimated sparse depth map, the first estimated pose information, a second video frame in the video frame sequence before the first video frame, a second estimated sparse depth map and second estimated pose information corresponding to the second video frame, and a target sparse depth map that is synchronized with the first video frame and acquired by a depth camera; and a third determining module, configured to determine a dense depth map corresponding to the first video frame based on the first video frame, the first corrected sparse depth map, the first corrected pose information, the second video frame, and a second corrected sparse depth map and second corrected pose information of the second video frame.

As an example of this application, the second determining module is configured to:

input the first video frame, the first estimated sparse depth map, the first estimated pose information, the second video frame, the second estimated sparse depth map, the second estimated pose information, and the target sparse depth map into a first target model for processing, and output the first corrected sparse depth map and the first corrected pose information, where the first target model is configured to determine a corrected sparse depth map and corrected pose information corresponding to any video frame based on the any video frame, an estimated sparse depth map and estimated pose information corresponding to the any video frame, another video frame located before the any video frame, an estimated sparse depth map and estimated pose information corresponding to the another video frame, and a sparse depth map that is synchronized with the any video frame and acquired by the depth camera.

As an example of this application, the second determining module is further configured to:

obtain a first sample data set, where the first sample data set includes a plurality of sets of first sample data, and each of the plurality of sets of first sample data includes a sparse depth map sample acquired by the depth camera, a video frame sample sequence acquired by the RGB camera, an estimated sparse sample depth map and estimated sample pose information corresponding to video frame samples in the video frame sample sequence, a true sparse depth map sample, and true sample pose information; and train a to-be-trained first network model based on the first sample data set to obtain the first target model.

As an example of this application, the third determining module is configured to:

input the first video frame, the first corrected sparse depth map, the first corrected pose information, the second video frame, the second corrected sparse depth map, and the second corrected pose information into a second target model for processing, and output the dense depth map, where the second target model is configured to determine a dense depth map corresponding to any video frame based on the any video frame, a corrected sparse depth map and corrected pose information corresponding to the any video frame, another video frame located before the any video frame, and a corrected sparse depth map and corrected pose information corresponding to the another video frame.

As an example of this application, the third determining module is further configured to:

obtain a second sample data set, where the second sample data set includes a plurality of sets of second sample data, and each of the plurality of sets of second sample data includes a video frame sample sequence, a corrected sparse depth map sample and corrected pose information corresponding to each video frame sample in the video frame sample sequence, and a true dense depth map corresponding to each video frame sample; and train a to-be-trained second network model based on the second sample data set to obtain the second target model.

As an example of this application, the first video frame is a key frame, and the second video frame is a key frame.

As an example of this application, a plurality of second video frames are provided, and the second determining module is further configured to:

determine the first corrected sparse depth map and the first corrected pose information based on the first video frame, the first estimated sparse depth map, the first estimated pose information, each of the plurality of second video frames, a second estimated sparse depth map and second estimated pose information corresponding to each second video frame, and the target sparse depth map.

As an example of this application, the third determining module is further configured to:

determine the dense depth map based on the first video frame, the first corrected sparse depth map, the first corrected pose information, each second video frame, and a second corrected sparse depth map and second corrected pose information corresponding to each second video frame.

According to a third aspect, an electronic device is provided. A structure of the electronic device includes a processor and a memory. The memory is configured to store a program supporting the electronic device to perform the method according to any implementation of the first aspect, and store data during implementation of the method according to any implementation of the first aspect. The processor is configured to execute the program stored in the memory. The electronic device may further include a communication bus for establishing a connection between the processor and the memory.

According to a fourth aspect, a computer-readable storage medium is provided, the computer-readable storage medium storing instructions, and the instructions, when run on a computer, cause the computer to perform the method according to any implementation of the first aspect.

According to a fifth aspect, a computer program product including instructions is provided, where the instructions, when run on a computer, cause the computer to perform the method according to the first aspect.

The technical effects obtained in the second aspect, the third aspect, the fourth aspect, and the fifth aspect are similar to the technical effect obtained by the corresponding technical means in the first aspect, and the details are not described herein again.

The technical solutions provided in this application can bring at least the following beneficial effects.

A first estimated sparse depth map and first estimated pose information corresponding to a first video frame in a video frame sequence are determined. The video frame sequence is acquired by a mobile RGB camera. A second sparse depth map synchronously acquired with the first video frame is obtained, and the second sparse depth map is acquired by a depth camera. A first corrected sparse depth map and first corrected pose information corresponding to the first video frame are determined based on the first video frame, the first estimated sparse depth map, the first estimated pose information, a second video frame in the video frame sequence before the first video frame, a second estimated sparse depth map and second estimated pose information corresponding to the second video frame, and a target sparse depth map that is synchronized with the first video frame and acquired by a depth camera. Since the first corrected sparse depth map and the first corrected pose information are determined based on a plurality of corrected sparse depth maps and corrected pose information from different angles and a target sparse depth map having depth information of an absolute dimension, the first corrected sparse depth map and the first corrected pose information are close to true values. Then a dense depth map corresponding to the first video frame is determined based on the first video frame, the first corrected sparse depth map, the first corrected pose information, the second video frame, a second corrected sparse depth map, and second corrected pose information. Since the first corrected sparse depth map and the first corrected pose information are more accurate, the second corrected sparse depth map and the second corrected pose information are also more accurate, and the first video frame and the second video frame are captured from different angles, a depth image having accurate and dense depth information can be finally obtained.

DESCRIPTION OF EMBODIMENTS

Figure 1:
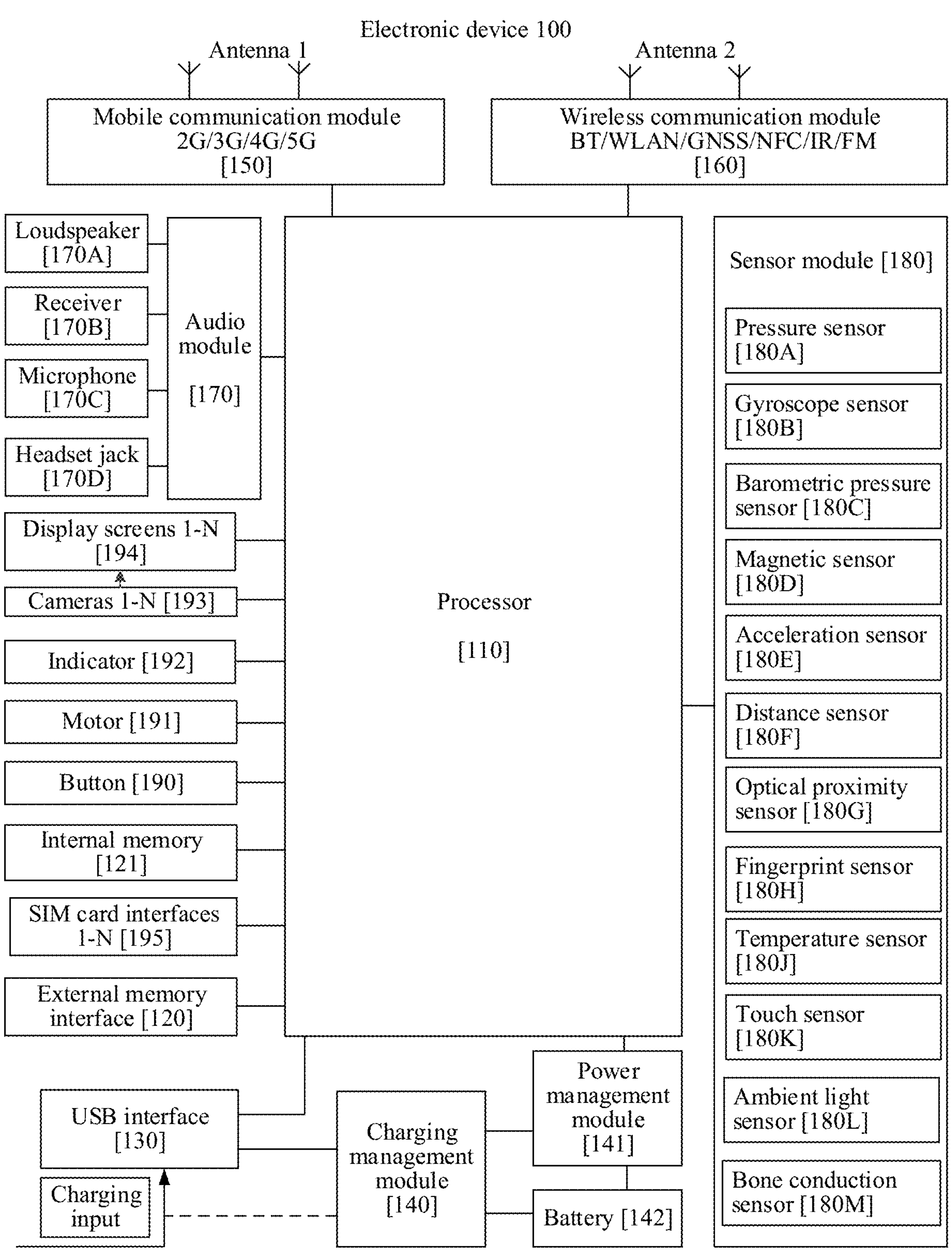
FIG. 1 is a system architecture diagram of an electronic device according to an embodiment of this application.

To make the objectives, technical solutions, and advantages of this application clearer, the following further describes implementations of this application in detail with reference to the accompanying drawings.

It should be understood that "a plurality of" mentioned in this application means two or more. In the descriptions of this application, "/" means "or" unless otherwise specified. For example, A/B may mean A or B. In this specification, "and/or" describes only an association relationship for describing associated objects and indicates that three relationships may exist. For example, A and/or B may represent the following three cases. Only A exists, both A and B exist, and only B exists. Moreover, for ease of describing the technical solutions of this application clearly, terms such as "first" and "second" are used to distinguish between same or similar items with basically same functions and roles. A person skilled in the art may understand that the terms "first", "second", and the like do not limit a number and an execution order, and the terms "first", "second", and the like are not limited to be necessarily different.

Before an image processing method provided in embodiments of this application is described in detail, the terms and execution subjects involved in the embodiments of this application are first briefly described.

First, the terms involved in the embodiments of this application are briefly described.

Depth information: The depth information represents a distance between a detection sensor (such as a depth camera) and a target, and is expressed by a pixel value in a range of 0 to 255.

Sparse depth map: The sparse depth map is a depth image having sparse depth information. For example, a depth image captured by a time of flight (time of flight, TOF) camera may be referred to as a sparse depth map.

Dense depth map: The dense depth map is a depth image having dense depth information.

Key frame: The key frame is a video frame that includes key content related to an action, which is mainly used to define transitional stages in an animation, and generally means a frame in which a key action is located during movement or changing of a character or an object, and a frame in an animation that presents a key action or content changes.

Pose information of video frame: The pose information of a video frame includes position information and pose information when a shooting apparatus (such as a camera) shoots the video frame.

Feature point: The feature point is composed of a key point and a descriptor. The key point is used for describing a position of the feature point in a video frame, and the descriptor is used for describing a relationship between the key point and pixels around the key point. The feature point should satisfy the invariance of illumination, scale, and rotation. Commonly used feature points at present include conventional geometric feature points and/or artificial intelligence (artificial intelligence, AI) feature points. As an example, the conventional geometric feature points may include, but are not limited to, scale invariant feature transform (scale invariant feature transform, SIFT), speed up robust feature (speed up robust feature, SURF). Harris Conner, and oriented fast and rotated brief (oriented fast and rotated brief, ORB). The AI feature points may include, but are not limited to. Super Point and learned invariant feature transform (learned invariant feature transform, LIFT).

Next, the execution subject involved in the embodiments of this application is described. The image processing method provided in this embodiment of this application may be performed by an electronic device. The electronic device is equipped with or connected with an RGB (red green blue, red green blue) camera and a depth camera, and the RGB camera and the depth camera work synchronously. As an example but not a limitation, the depth camera may be a TOF camera. As an example but not a limitation, the electronic device may include, but is not limited to, a wearable device and a terminal device. For example, the wearable device may include, but is not limited to, smart goggles, smart glasses, a smart helmet, and a smart bracelet. The terminal device may include, but is not limited to a mobile phone, a tablet computer, an augmented reality (augmented reality, AR)/virtual reality (virtual reality, VR) device, an ultra-mobile personal computer (ultra-mobile personal computer, UMPC), a notebook computer, a netbook, or a personal digital assistant (personal digital assistant, PDA).

Referring to FIG. 1. FIG. 1 is a schematic structural diagram of an electronic device according to an embodiment of this application.

The electronic device 100 may include a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a loudspeaker 170A, a receiver 170B, a microphone 170C, a headset jack 170D, a sensor module 180, a button 190, a motor 191, an indicator 192, a camera 193, a display screen 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, a proximity light sensor 180G, a fingerprint sensor 180H, a temperature sensor 180J, a touch sensor 180K, an ambient light sensor 180L, a bone conduction sensor 180M, and the like.

It may be understood that an example structure in this embodiment of this application does not constitute a specific limitation on the electronic device 100. In some other embodiments of this application, the electronic device 100 may include more or fewer components than those shown in the figure, or some components may be combined, or some components may be divided, or different component arrangements may be used. The components shown in the figure may be implemented by hardware, software, or a combination of software and hardware.

A memory may further be arranged in the processor 110, configured to store instructions and data. In some embodiments, the memory in the processor 110 is a cache memory. The memory may store instructions or data recently used or cyclically used by the processor 110. If the processor 110 needs to use the instruction or the data again, the processor may directly invoke the instruction or the data from the memory. Repeated access is avoided, and waiting time of the processor 110 is reduced, thereby improving system efficiency.

It may be understood that a schematic interface connection relationship between the modules in the embodiments of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

A wireless communication function of the electronic device 100 may be implemented through the antenna 1, the antenna 2, the mobile communication module 150, the wireless communication module 160, the modem processor, the baseband processor, and the like.

In some embodiments, the antenna 1 and the mobile communication module 150) are coupled, and the antenna 2 and the wireless communication module 160 of the electronic device 100 are coupled, so that the electronic device 100 can communicate with a network and another device through a wireless communication technology.

The electronic device 100 implements a display function through the GPU, the display screen 194, the application processor, and the like. The GPU is a microprocessor for image processing and connects the display screen 194 to the application processor. The GPU is configured to perform mathematical and geometric calculation, and is configured to perform graphics rendering. The processor 110 may include one or more GPUs that execute a program instruction to generate or change display information.

As an example of this application, the display screen 194 is configured to display the finally generated dense depth map, and the like. The display screen 194 includes a display panel.

The electronic device 100 may implement a photographing function through the ISP, the camera 193, the video codec, the GPU, the display screen 194, the application processor, and the like.

The ISP is configured to process data fed back by the camera 193. For example, during photographing, a shutter is enabled. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may further optimize algorithms of noise point, brightness, and skin tone of the image. The ISP may further optimize parameters such as exposure and color temperature of a photographed scene. In some embodiments, the ISP may be arranged in the camera 193.

The camera 193 is configured to capture a still image or video. An optical image is generated for an object through the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in standard formats such as RGB and YUV. In some embodiments, the electronic device 100 may include 1 or N cameras 193, and N is a positive integer greater than 1. As an example of this application, the electronic device 100 includes a plurality of cameras 193, such as an RGB camera and a TOF camera, which are respectively configured to acquire a video frame sequence and a sparse depth map sequence.

The digital signal processor is configured to process a digital signal, and in addition to a digital image signal, the digital signal processor may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1. MPEG 2, MPEG 3, and MPEG 4.

The NPU is a neural-network (neural-network, NN) computing processor, quickly processes input information by referring to a structure of a biological neural network, for example, a transmission mode between neurons in a human brain, and may further continuously perform self-learning. The NPU may be configured to implement an application such as intelligent cognition of the electronic device 100, for example, image recognition, face recognition, voice recognition, and text understanding.

The internal memory 121 may be configured to store computer-executable program code. The executable program code includes instructions. For example, the internal memory may be configured to store models involved in the embodiments of this application, including, for example, a first target model and a second target model. The processor 110 runs the instructions stored in the internal memory 121, to implement various functional applications and data processing of the electronic device 100. The internal memory 121 may include a program storage area and a data storage area. The program storage area may store an operating system, an application required by at least one function (such as a sound playback function and an image display function), and the like. The data storage area may store data (such as audio data and an address book) and the like created during use of the electronic device 100. In addition, the internal memory 121 may include a high-speed random access memory, and may further include a non-volatile memory, for example, at least one magnetic disk storage device, a flash memory device, or a universal flash storage (universal flash storage, UFS).

The electronic device 100 may implement an audio function through the audio module 170, the loudspeaker 170A, the receiver 170B, the microphone 170C, the headset jack 170D, the application processor, and the like, for example, music playback and recording.

The distance sensor 180F is configured to measure a distance. The electronic device 100 may measure a distance through infrared light or laser. In some embodiments, in a shooting scenario, the electronic device 100 may measure a distance by using the distance sensor 180F, to implement quick focusing.

A software system of the electronic device 100 may use a layered architecture, an event-driven architecture, a micro core architecture, a micro service architecture, or a cloud architecture. In this embodiment of this application, the software structure of the electronic device 100 is described through examples by using an Android system with a layered architecture as an example.

Figure 2:
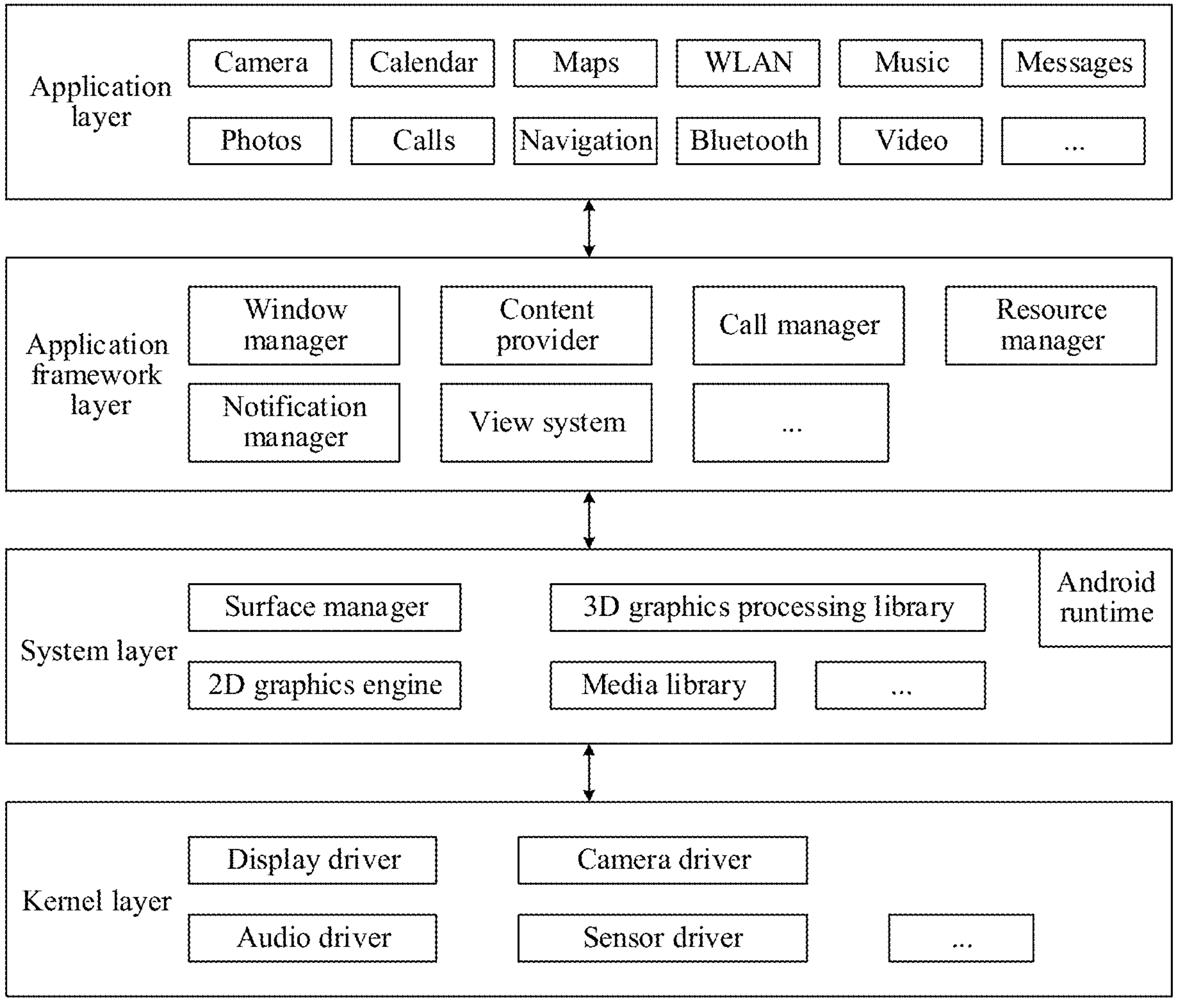
FIG. 2 is a software architecture diagram of an electronic device according to an embodiment of this application.

FIG. 2 is a block diagram of a software structure of an electronic device 100 according to an embodiment of this application.

In the layered architecture, software is divided into several layers, and each layer has a clear role and division of labor. The layers communicate with each other through a software interface. In some embodiments, the Android system is divided into four layers, which are an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for applications at the application layer. The application framework layer includes some predefined functions.

As shown in FIG. 2, the application framework layer may include a window manager, a content provider, a view system, a phone manager, a resource manager, a notification manager, and the like.

The view system includes a visual control such as a control for text display or a control for picture display (such as display of the dense depth map in this embodiment of this application), and the like.

The resource manager provides various resources such as a localized character string, an icon, an image, a layout file, and a video file for an application.

The core library includes two parts: one part is a performance function that the Java language needs to invoke, and the other part is a core library of Android.

The application layer and the application framework layer are run in the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of functional modules, For example, a surface manager (surface manager), a media library (Media Libraries), a three-dimensional graphics processing library (for example, OpenGL ES), and a 2D graphics engine (for example, SGL).

The surface manager is configured to manage a display subsystem, and provide fusion of 2D layers and 3D layers for a plurality of applications.

The media library supports playback and recording in a plurality of common audio and video formats, static image files, and the like. The media library may support a plurality of audio and video encoding formats, for example, MPEG 4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display drive, a camera drive, an audio drive, and a sensor drive. For example, the camera driver is configured to drive a camera to be powered on, thereby completing camera loading. As an example of this application, when the electronic device includes a plurality of cameras, such as an RGB camera and a TOF camera, the camera driver can drive each of the plurality of cameras.

After the execution subject involved in this embodiment of this application is described, the method provided in this embodiment of this application is described in detail with reference to the accompanying drawings.

Figure 3:
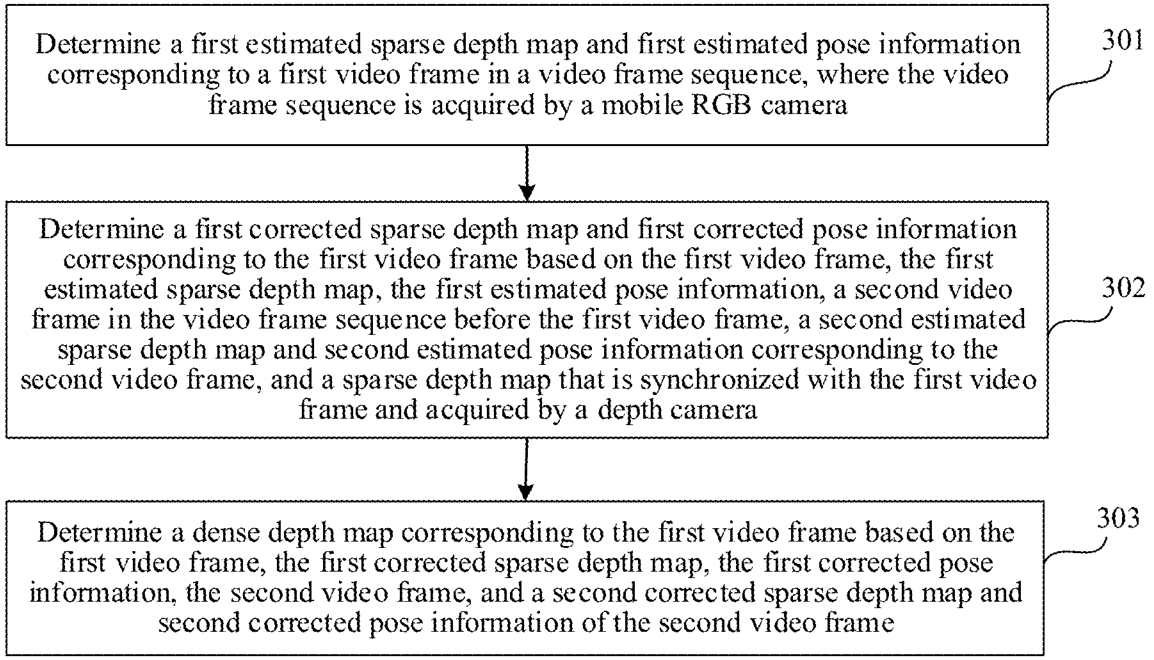
FIG. 3 is a schematic flowchart of an image processing method according to an embodiment of this application.

Referring to FIG. 3. FIG. 3 is a schematic flowchart of an image processing method according to an embodiment of this application. As an example but not a limitation, the method may be applied to the above electronic device, and the method may include the following content:

Step 301: Determine a first estimated sparse depth map and first estimated pose information corresponding to a first video frame in a video frame sequence, where the video frame sequence is acquired by a mobile RGB camera.

As an example of this application, the first video frame is a key frame. That is to say, the electronic device may extract key frames in the video sequence, and then determine a first estimated sparse depth map and first estimated pose information corresponding to the key frames. It is worth mentioning that in some scenarios, the video frame processing amount of the video frame sequence can be reduced by performing processing on the video frames including key content in the video frame sequence.

Certainly, this embodiment of this application is described by using the first video frame as a key frame by way of example. In another embodiment, the first video frame may further be any video frame in the video frame sequence, which is not limited by this embodiment of this application.

In an example, the first estimated pose information is used for indicating a positional relationship between the first video frame and an adjacent video frame. As an example, an adjacent video frame is a video frame adjacent to the first video frame in a video frame sequence. For example, an adjacent video frame is a previous frame of the first video frame. In a possible implementation, when the first video frame is a key frame, an adjacent video frame may be a key frame adjacent to the first video frame, that is, an adjacent video frame is also a key frame in a video frame sequence.

Figure 4A:
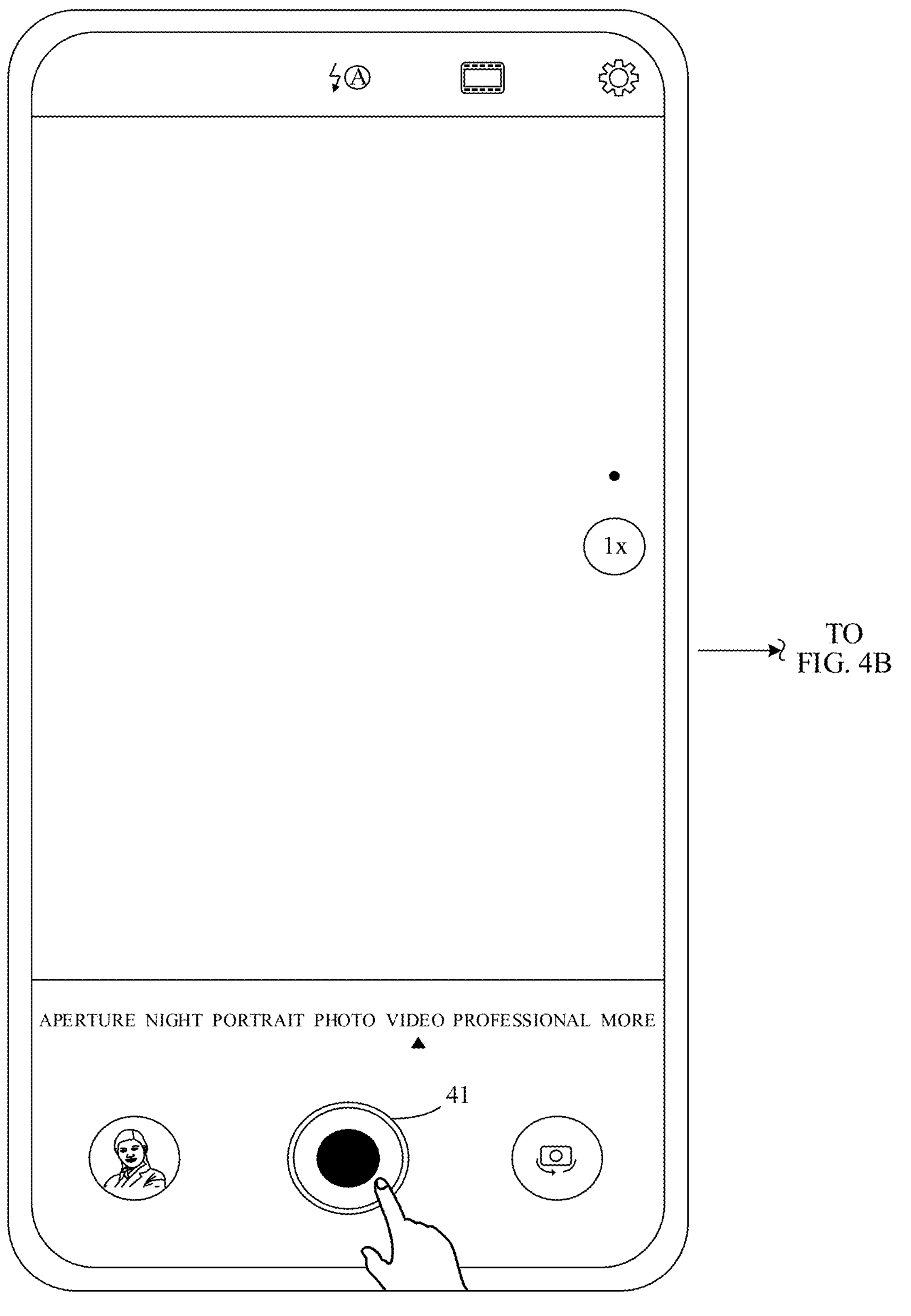
FIG. 4A and FIG. 4B are schematic diagrams showing interaction of an application scenario according to an embodiment of this application.
Figure 4B:
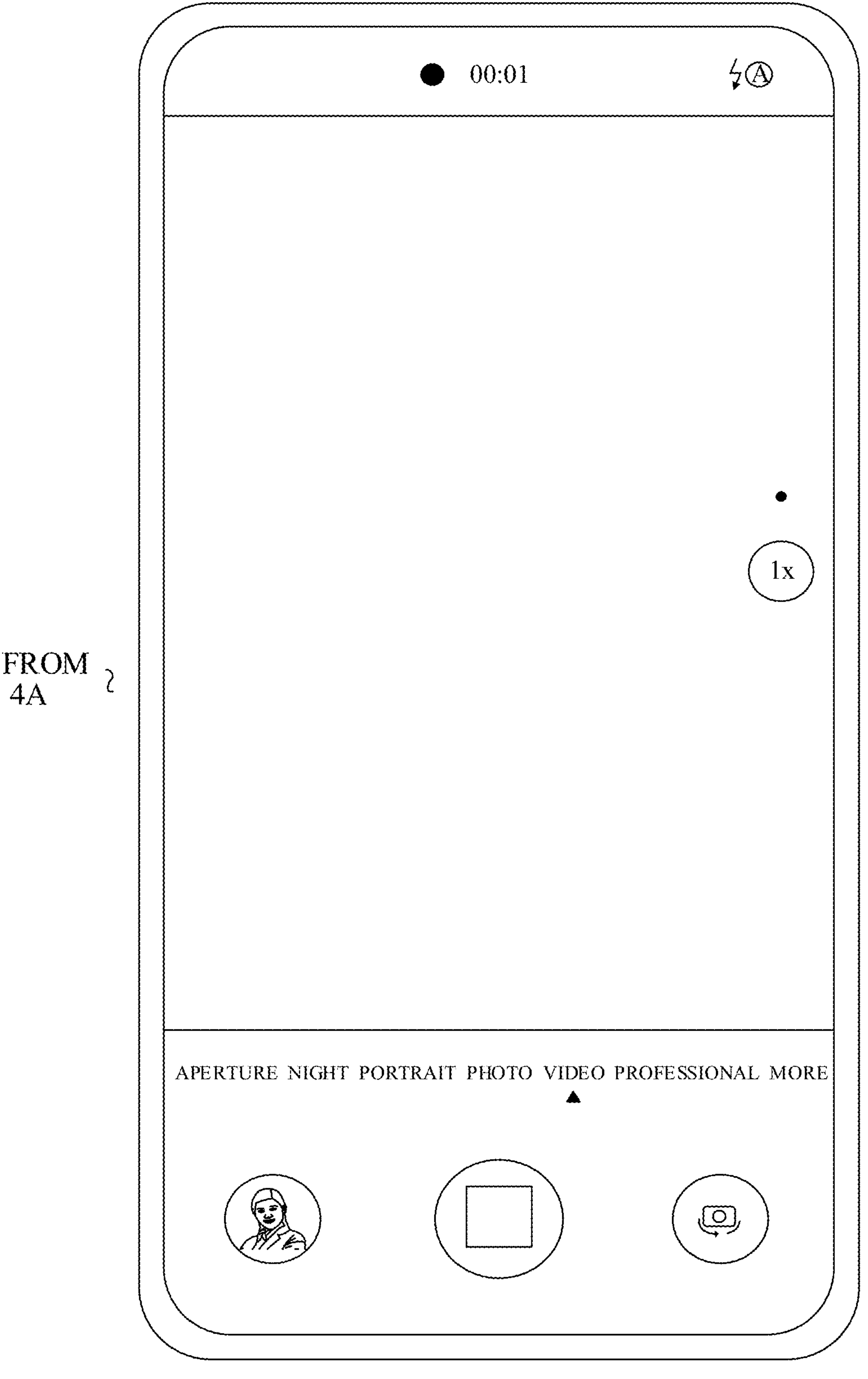
Figure 5:
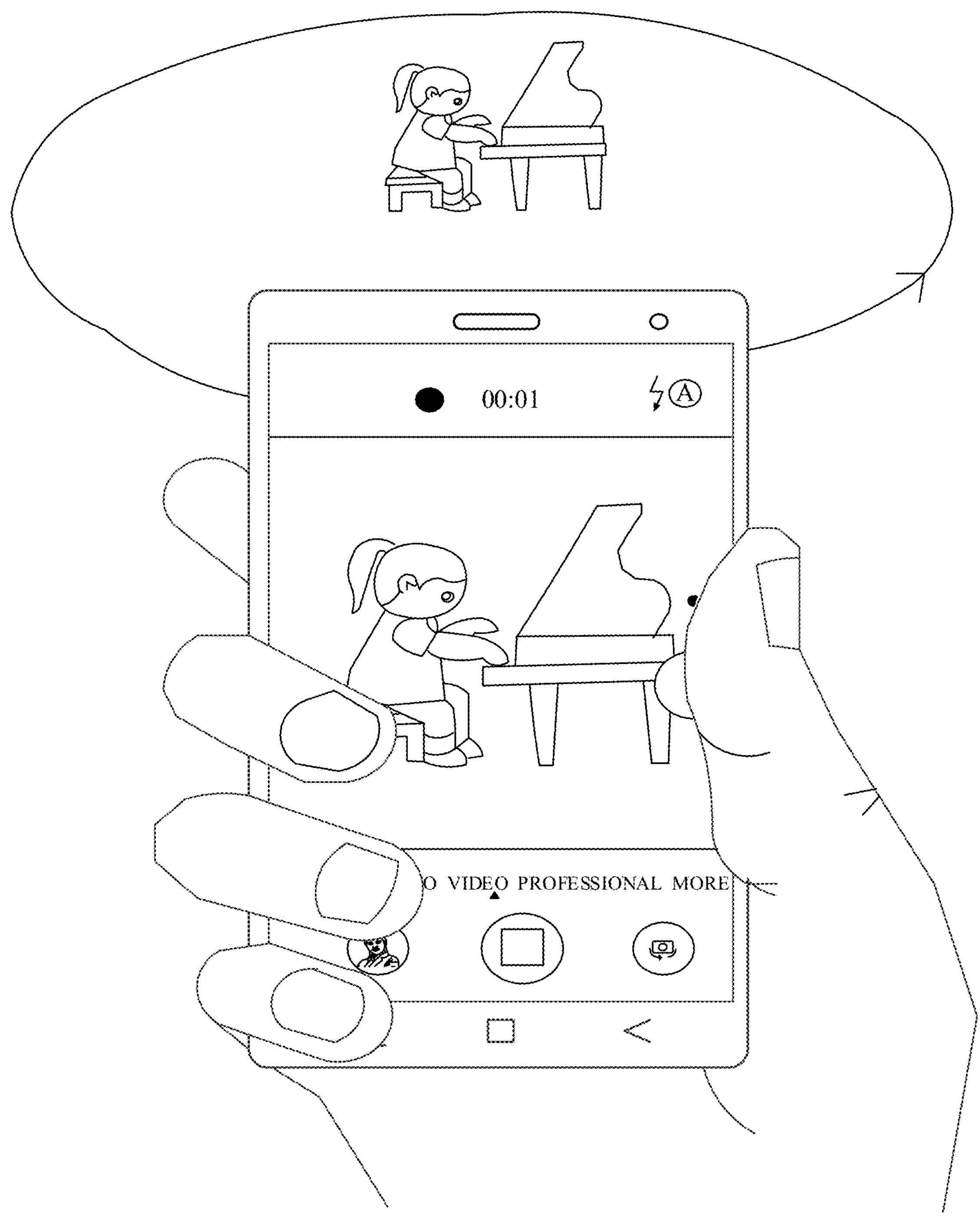
FIG. 5 is a schematic diagram of another application scenario according to an embodiment of this application.

The video frame sequence is obtained by recording a video through the RGB camera by the mobile electronic device after receiving a video recording instruction. The video recording instruction may be triggered by a user, and the user may trigger the video recording instruction through a specified operation. For example, the specified operation may include but is not limited to a tap operation and a sliding operation. In an embodiment, the electronic device is a mobile phone by way of example. The mobile phone includes a camera application, and when the user wants to perform shooting through the mobile phone, the user may trigger the camera application, for example, by tapping an application icon of the camera application. The mobile phone starts the camera application in response to the trigger operation performed on the camera application by the user. Referring to FIG. 4A, a video recording option 41 is provided in the camera application, and the user may trigger the video recording option 41. In this case, the mobile phone detects a video recording instruction. In response to the video recording instruction, the mobile phone enables the video recording function, as shown in FIG. 4B. In this case, the mobile phone starts the RGB camera and the depth camera, so that the video can be recorded synchronously through the RGB camera and the depth camera. As an example, during the video recording by the mobile phone, the user may hold the mobile phone and move, so that the mobile phone is in a moving state. For example, as shown in FIG. 5, the user may hold the mobile phone and circle around a target. In the process, the mobile phone uses the video recorded through the RGB camera as a video frame sequence.

Figure 6:
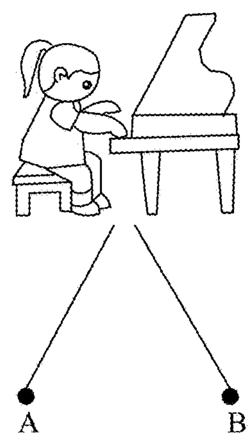
FIG. 6 is a schematic diagram of a video frame acquisition position in an application scenario according to an embodiment of this application.

In this embodiment of this application, for a first video frame in the video frame sequence, in order to determine a dense depth map of the first video frame, the electronic device determines a first estimated sparse depth map and first estimated pose information corresponding to the first video frame. As an example but not a limitation, the electronic device may determine the first estimated sparse depth map and the first estimated pose information corresponding to the first video frame based on the first video frame and an adjacent video frame. Specifically, since the electronic device is moving while recording in the process of acquiring the video frame sequence, it is not difficult to understand that the first video frame and the adjacent video frame are acquired at two different positions. For example, referring to FIG. 6, the first video frame is acquired at point A. and the adjacent video frame is acquired at point B. It may be understood herein that a camera exists at point A (assuming that a first camera exists) and another camera exists at point B (assuming that a second camera exists). Therefore, logically, it may be considered that the first video frame is acquired through the first camera and the adjacent video frame is acquired through the second camera. That is to say, it may be understood that the first video frame and the adjacent video frame are two video frames acquired through binocular cameras (including the first camera and the second camera), or two video frames obtained by capturing a same target from two different angles. Therefore, in an embodiment, the first estimated sparse depth map corresponding to the first video frame and the positional relationship between the first video frame and the adjacent video frame may be estimated based on the first video frame and the adjacent video frame, that is, the first estimated pose information corresponding to the first video frame may be estimated. That is to say, the first estimated sparse depth map and the first estimated pose information corresponding to the first video frame are obtained through estimation.

In an embodiment, the electronic device determines the first estimated sparse depth map and the first estimated pose information corresponding to the first video frame through a preset algorithm based on the first video frame and the adjacent video frame. For example, the preset algorithm may include but is not limited to ARCore, ARkit, AREngine, or another multiple view geometric algorithm.

For example, the implementation of determining the first estimated sparse depth map and the first estimated pose information based on the first video frame and the adjacent video frame may include the following steps.

3011: Extract feature points in the first video frame and the adjacent video frame respectively.

The feature point may be used for describing a feature of a local region of a video frame. For example, the local region includes a corner point, an edge point, a bright point in a dark region, and a dark point in a bright region.

As an example but not a limitation, the feature points in the first video frame extracted by the electronic device may include conventional geometric feature points and/or AI feature points, and the feature points extracted in the second video frame may include conventional geometric feature points and/or AI feature points.

3012: Match the feature points included in the first video frame and the feature points included in the second video frame to determine a matching point pair.

Figure 7:
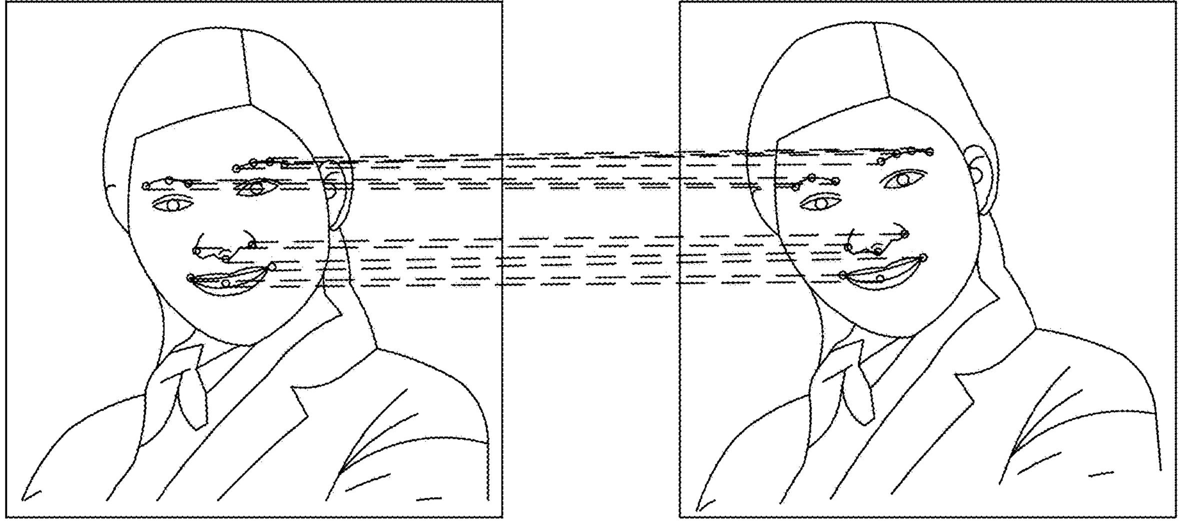
FIG. 7 is a schematic diagram of a matching point pair according to an embodiment of this application.

Each matching point pair includes a feature point corresponding to a part of a target (or a point) in the first video frame and a feature point corresponding to the part in the second video frame. Alternatively, it may be understood that two feature points included in the matching point pair are respectively used for describing features of a part of the target at different angles. For example, referring to FIG. 7. FIG. 7 is a schematic diagram of partial matching point pairs in two video frames according to an example embodiment. For convenience of understanding, two feature points in each matching point pair are connected by a dashed line for representation herein.

As an example but not a limitation, the feature points included in the first video frame and the feature points included in the second video frame may be matched through Brute-force (brute-froce matcher) to determine the matching feature points in the two video frames, so as to determine the matching point pairs.

3013: Screen the determined matching point pairs.

During the matching of feature points, matching dislocation may exist, that is, false matching point pairs exist. In order to improve the accuracy of the subsequent determination of the first estimated sparse depth map and the first estimated pose information, the electronic device may screen the matching point pairs to screen out the false matching point pairs.

As an example of this application, a random sample consensus (Random Sample Consensus, RANSAC) algorithm may be used to screen matching point pairs. The RANSAC algorithm is a non-deterministic algorithm that estimates parameters of a mathematical model from a set of observed data including outliers in an iterative manner to obtain effective sample data. During implementation, the electronic device uses the RANSAC algorithm to divide the matching point pairs into interior points and exterior points, and uses the relatively accurate characteristics of data of the interior points to perform parameter estimation, thereby eliminating inaccurate matching point pairs and obtaining more robust estimation results. For example, the implementation process of screening matching point pairs through the RANSAC algorithm may include the following substeps (1) to (5).

(1) Randomly select K feature points from a target data set S.

As an example of this application, the target data set S includes all matching point pairs selected through the above steps.

K is a minimum number of feature points needed to solve a model. K may be set as required, and K is less than a number of feature points included in the target data set S.

(2) Perform model fitting based on the K feature points to obtain a fundamental matrix model.

For example, the fundamental matrix model may be an F matrix or an H matrix.

(3) Based on the fundamental matrix model, perform determination on other feature points in the target data set S. and count the interior points and the exterior points in other feature points.

During implementation, a distance between each of the other feature points and the fundamental matrix model is calculated. For any one of the other feature points, if the distance between the feature point and the fundamental matrix model is less than a distance threshold, the feature point is determined as an interior point. Otherwise, if the distance between the feature point and the fundamental matrix model is greater than or equal to the distance threshold, the feature point is determined as an exterior point. The distance may be set based on actual needs.

(4) Count the number of interior points corresponding to the current fundamental matrix model to obtain interior point values corresponding to the current fundamental matrix model.

Then step (1) is performed, and the above steps are iterated. In this way, after a preset number of iterations, the fundamental matrix model corresponding to the maximum interior point value is selected as a target fundamental matrix model. The preset number may be set based on actual needs.

(5) Re-estimate the target fundamental matrix model based on all interior points.

3014: Determine a first estimated sparse depth map and first estimated pose information based on the selected matching point pairs.

As an example but not a limitation, based on the selected matching point pairs, the first estimated sparse depth map and the first estimated pose information may be determined through a method such as pose tracking.

Step 302: Determine a first corrected sparse depth map and first corrected pose information corresponding to the first video frame based on the first video frame, the first estimated sparse depth map, the first estimated pose information, a second video frame in the video frame sequence before the first video frame, a second estimated sparse depth map and second estimated pose information corresponding to the second video frame, and a target sparse depth map that is synchronized with the first video frame and acquired by a depth camera.

In an example, one second video frame is provided. In another example, a plurality of second video frames are provided.

As an example of this application, the second estimated sparse depth map and the second estimated pose information corresponding to the second video frame are obtained in a manner of determining the first estimated sparse depth map and the first estimated pose information.

The RGB camera and the depth camera work synchronously, that is, the RGB camera and the depth camera perform video recording synchronously. In this way, for each video frame in the video frame sequence, a sparse depth map corresponding to the video frame exists in the sparse depth map sequence recorded by the depth camera. That is to say, for the first video frame, a sparse depth map corresponding to the first video frame exists in the sparse depth map sequence recorded by the depth camera. The sparse depth map is synchronously acquired with the first video frame. For the convenience of understanding and distinction, the sparse depth map is referred to as the target sparse depth map herein.

Since the first estimated sparse depth map and the first estimated pose information are estimated based on the first video frame, some errors may exist between the first estimated sparse depth map and the first estimated pose information compared with a true value. In addition, it is considered that if a monitoring target can be monitored from a plurality of angles, monitoring results from the plurality of angles can be used to describe the target more comprehensively, so that depth information of the target can be determined as accurately as possible. Moreover, since the target sparse depth map is acquired by the depth camera, the depth information of the target sparse depth map is accurate. Therefore, in this embodiment of this application, the electronic device fuses the first video frame, the second video frame (possibly one or more), their respective corresponding estimated sparse depth maps and estimated pose information, and the target sparse depth map to obtain the first corrected sparse depth map and the first corrected pose information as close as possible to the true value.

The first corrected pose information is used to describe the positional relationship between the first video frame and the adjacent video frame. Compared with the first estimated pose information, the first corrected pose information is closer to the true value. Similarly, compared with the first estimated sparse depth map, the first corrected sparse depth map is closer to the true value.

As an example of this application, a specific implementation of step 302 may include: inputting the first video frame, the first estimated sparse depth map, the first estimated pose information, the second video frame, the second estimated sparse depth map, the second estimated pose information, and the target sparse depth map into a first target model for processing, and outputting the first corrected sparse depth map and the first corrected pose information.

The first target model is obtained by training in advance. The training process is described in a first embodiment about model training below. The first target model is configured to determine a corrected sparse depth map and corrected pose information corresponding to any video frame based on the any video frame, an estimated sparse depth map and estimated pose information corresponding to the any video frame, another video frame located before the any video frame, an estimated sparse depth map and estimated pose information corresponding to the another video frame, and a sparse depth map that is synchronized with the any video frame and acquired by the depth camera.

In an embodiment, the estimated sparse depth map and the estimated pose information corresponding to the any video frame may be obtained in a manner of determining the first estimated sparse depth map and the first estimated pose information.

A number of other video frames located before the any video frame may be one or more.

In an embodiment, the estimated sparse depth map and the estimated pose information corresponding to the other video frame may be obtained in a manner of determining the first estimated sparse depth map and the first estimated pose information.

As an example of this application, a first target model that has been trained in advance is stored in an electronic device. The electronic device may invoke the first target model, and then output all of the first video frame, the first estimated sparse depth map, the first estimated pose information, the second video frame, the second estimated sparse depth map, the second estimated pose information, and the target sparse depth map to the first target model for processing by the first target model. Then, the first target model outputs the first corrected sparse depth map and the first corrected pose information corresponding to the first video frame. In this way, fusion through the first target model can improve fusion efficiency.

It should be noted that, the first target model is stored in the electronic device by way of example for description above. In another embodiment, the first target model may further be stored in the cloud. In this case, the electronic device may upload the first video frame, the first estimated sparse depth map, the first estimated pose information, the second video frame, the second estimated sparse depth map, the second estimated pose information, and the target sparse depth map to the cloud, and instruct the cloud to perform fusion processing based on the uploaded data. For the cloud, the first corrected sparse depth map and the first corrected pose information are determined through the first target model based on the first video frame, the first estimated sparse depth map, the first estimated pose information, the second video frame, the second estimated sparse depth map, the second estimated pose information, and the target sparse depth map. Then, the cloud transmits the determined first corrected sparse depth map and first corrected pose information to the electronic device. In this way, an amount of computation of the electronic device can be reduced to a specific extent.

As an example of this application, when a plurality of second video frames are provided, a specific implementation of step 302 is: determining the first corrected sparse depth map and the first corrected pose information based on the first video frame, the first estimated sparse depth map, the first estimated pose information, each of the plurality of second video frames, a second estimated sparse depth map and second estimated pose information corresponding to each second video frame, and the target sparse depth map.

In an embodiment, the second estimated sparse depth map and the second estimated pose information corresponding to each second video frame may be obtained in a manner of determining the first estimated sparse depth map and the first estimated pose information.

In an embodiment, when a plurality of second video frames are provided, a specific implementation of determining the first corrected sparse depth map and the first corrected pose information based on the first video frame, the first estimated sparse depth map, the first estimated pose information, each of the plurality of second video frames, a second estimated sparse depth map and second estimated pose information corresponding to each second video frame, and the target sparse depth map may include: inputting the first video frame, the first estimated sparse depth map, the first estimated pose information, each of the plurality of second video frames, a second estimated sparse depth map and second estimated pose information corresponding to each second video frame, and the target sparse depth map into the first target model, so as to determine the first corrected sparse depth map and the first corrected pose information through the first target model.

That is to say, when a plurality of second video frames are provided, the electronic device may still determine the first corrected sparse depth map and the first corrected pose information corresponding to the first video frame through the first target model.

It is worth mentioning that, when a plurality of second video frames are provided, it indicates that depth information of a target may be determined from more angles, that is, rich depth information may be determined, so that the finally determined first corrected sparse depth map and first corrected pose information are more accurate.

Step 303: Determine a dense depth map corresponding to the first video frame based on the first video frame, the first corrected sparse depth map, the first corrected pose information, the second video frame, and a second corrected sparse depth map and second corrected pose information of the second video frame.

As an example of this application, the second corrected sparse depth map and the second corrected pose information are obtained in a manner of determining the first corrected sparse depth map and the first corrected pose information.

Since the first corrected sparse depth map and the first corrected pose information are more accurate, the second corrected sparse depth map and the second corrected pose information are also more accurate, and the first video frame and the second video frame are captured from different angles, the electronic device can obtain a depth image having accurate and dense depth information based on the first video frame, the first corrected sparse depth map, the first corrected pose information, the second video frame, the second corrected sparse depth map, and the second corrected pose information, that is, the dense depth map corresponding to the first video frame, thereby improving the phenomenon of incomplete display in some regions.

As an example of this application, a specific implementation of step 303 may include: inputting the first video frame, the first corrected sparse depth map, the first corrected pose information, the second video frame, the second corrected sparse depth map, and the second corrected pose information into a second target model for processing, and outputting the dense depth map.

The second target model is obtained by training in advance. The training process is described in a second embodiment about model training below. The second target model is configured to determine a dense depth map corresponding to any video frame based on the any video frame, a corrected sparse depth map and corrected pose information corresponding to the any video frame, another video frame located before the any video frame, and a corrected sparse depth map and corrected pose information corresponding to the another video frame.

As an example but not a limitation, the corrected sparse depth map and the corrected pose information corresponding to the any video frame may be obtained in a manner of determining the first corrected sparse depth map and the first corrected pose information.

A number of other video frames located before the any video frame may be one or more.

As an example but not a limitation, the corrected sparse depth map and the corrected pose information corresponding to the another video frame may be obtained in a manner of determining the first corrected sparse depth map and the first corrected pose information.

As an example of this application, a second target model that has been trained in advance is stored in an electronic device. The electronic device may invoke the second target model, and then output all of the first video frame, the first corrected sparse depth map, the first corrected pose information, the second video frame, the second corrected sparse depth map, and the second corrected pose information to the second target model for processing by the second target model. Then the second target model outputs the dense depth map corresponding to the first video frame. In this way, determination efficiency can be improved by determining the dense depth map through the second target model.

It should be noted that the second target model is stored in the electronic device by way of example for description above. In another embodiment, the second target model may also be stored in the cloud. In this case, the electronic device may upload the first video frame, the first corrected sparse depth map, the first corrected pose information, the second video frame, the second corrected sparse depth map, and the second corrected pose information to the cloud, and instruct the cloud to determine a dense depth map based on the uploaded data. For the cloud, the dense depth map is determined through the second target model based on the first video frame, the first corrected sparse depth map, the first corrected pose information, the second video frame, the second corrected sparse depth map, and the second corrected pose information. Then the cloud transmits the determined dense depth map to the electronic device. In this way, an amount of computation of the electronic device can be reduced to a specific extent.

As an example of this application, when a plurality of second video frames are provided, a specific implementation of step 303 is: determining the dense depth map based on the first video frame, the first corrected sparse depth map, the first corrected pose information, each second video frame, and a second corrected sparse depth map and second corrected pose information corresponding to each second video frame.

In an embodiment, the second corrected sparse depth map and the second corrected pose information corresponding to each second video frame may be obtained in a manner of determining the first corrected sparse depth map and the first corrected pose information.

In an embodiment, when a plurality of second video frames are provided, a specific implementation of determining the dense depth map based on the first video frame, the first corrected sparse depth map, the first corrected pose information, each second video frame, and a second corrected sparse depth map and second corrected pose information corresponding to each second video frame may include: inputting the first video frame, the first corrected sparse depth map, the first corrected pose information, each second video frame, and a second corrected sparse depth map and second corrected pose information corresponding to each second video frame into the second target model for processing, so as to determine the dense depth map through the second target model.

That is to say, when a plurality of second video frames are provided, the electronic device may still determine the dense depth map corresponding to the first video frame through the second target model.

It is worth mentioning that, when a plurality of second video frames are provided, it indicates that depth information of a target may be determined from more angles, that is, rich depth information may be determined, so that a depth image having dense and accurate depth information can be determined.

It should be noted that the above is described by using the example of directly determining the first estimated pose information and using the first estimated pose information to perform subsequent operations. In another embodiment, a matching relationship may further be determined first, and then the first estimated pose information may be determined based on the matching relationship. The matching relationship is also used for describing a positional relationship between the first video frame and an adjacent video frame. Alternatively, after the first estimated pose information is directly determined, the first estimated pose information may further be converted into a matching relationship, and then subsequent operations are performed based on the matching relationship. That is to say, the first estimated pose information and the matching relationship may be converted to each other. For example, the conversion may be performed through a point-to-point method, and the like.

In addition, it should be further noted that, one first video frame is used as an example for description in this embodiment of this application. During implementation, a video frame sequence may include a plurality of first video frames. For example, the video frame sequence includes a plurality of key frames. For each of the plurality of first video frames, a dense depth map corresponding to each first video frame may be determined based on the above method.

In this embodiment of this application, a first estimated sparse depth map and first estimated pose information corresponding to the first video frame in the video frame sequence are determined. The video frame sequence is acquired by a mobile RGB camera. A second sparse depth map synchronously acquired with the first video frame is obtained, and the second sparse depth map is acquired by a depth camera. A first corrected sparse depth map and first corrected pose information corresponding to the first video frame are determined based on the first video frame, the first estimated sparse depth map, the first estimated pose information, a second video frame in the video frame sequence before the first video frame, a second estimated sparse depth map and second estimated pose information corresponding to the second video frame, and a target sparse depth map that is synchronized with the first video frame and acquired by a depth camera. Since the first corrected sparse depth map and the first corrected pose information are determined based on a plurality of corrected sparse depth maps and corrected pose information from different angles and a target sparse depth map having depth information of an absolute dimension, the first corrected sparse depth map and the first corrected pose information are close to true values. Then a dense depth map corresponding to the first video frame is determined based on the first video frame, the first corrected sparse depth map, the first corrected pose information, the second video frame, a second corrected sparse depth map, and second corrected pose information. Since the first corrected sparse depth map and the first corrected pose information are more accurate, the second corrected sparse depth map and the second corrected pose information are also more accurate, and the first video frame and the second video frame are captured from different angles, a depth image having accurate and dense depth information can be finally obtained. In this way, an index requirement for the depth camera is also reduced.

As an example of this application, a model training method is further provided. The method may be performed by the foregoing electronic device, or may be performed by another electronic device. In this case, after the another electronic device completes the model training, the finally obtained first target model is transmitted to the electronic device or the cloud for storage. The method may include the following contents.

801: Obtain a first sample data set.

The first sample data set includes a plurality of sets of first sample data, and each of the plurality of sets of first sample data includes a sparse depth map sample acquired by the depth camera, a video frame sample sequence acquired by the RGB camera, an estimated sparse sample depth map and estimated sample pose information corresponding to video frame samples in the video frame sample sequence, a true sparse depth map sample, and true sample pose information; and As an example of this application, the depth camera that acquires the sparse depth map sample may be a TOF camera. The depth camera and the RGB camera synchronously perform video recording.

As an example of this application, the true sparse depth map sample may be acquired by a depth camera with excellent indicators, that is, the depth camera may obtain dense depth information. For example, the depth camera may adopt a video graphics array (Video Graphics Array, VGA) depth camera, and correspondingly, the true sample pose information is pose information of the depth camera during acquisition of the true sparse depth map sample. During collection of samples, the depth camera and the RGB camera synchronously perform video recording and capture a same target.

The video frame sample sequence is acquired by a mobile RGB camera.

In an example, each video frame sample may be a key frame sample included in a video frame sample sequence.

The estimated sparse sample depth map and the estimated sample pose information corresponding to each video frame sample may be obtained in a manner of determining the first estimated sparse depth map and the first estimated pose information.

802: Train a to-be-trained first network model based on the first sample data set to obtain the first target model.

During implementation, an end-to-end network model is constructed, and the end-to-end network model is a first network model. In an embodiment, the first network model may include, but is not limited to, a visual geometry group (Visual Geometry Group, VGG) network or a residual network (Residual Network, RESNET)-50 network. In another embodiment, the first network model may be a U-net network.

A first loss function is constructed, and the first loss function is used to describe a difference between a true value and an estimated value. In this embodiment, the true value is a true sparse depth map sample, and the estimated value is a sparse depth map estimated through the first network model. As an example of this application, the first loss function is constructed based on a geometric error between the true value and the estimated value, and a similarity error of the video frame samples. The similarity error of the video frame samples is used to describe a back-projection error of the pose information.

For example, the geometric error may be determined through formula (1):

$$l_d = \sum_i \text{mask}(d_i - \tilde{d}i) \tag{1}$$

where $l_d$ represents the geometric error, i represents the $i^{th}$ first sample data, $d_i$ represents the true value, and $\tilde{d}_i$ represents the estimated value.

Moreover, the similarity error of the video frame samples may be determined through formula (2):

$$l_p = \alpha\frac{1 - SSIM(\tilde{I}_S I_S)}{2} + (1-\alpha)\|\tilde{I}_S - I_S\| \tag{2}$$

where $\tilde{I}_s$ is determined through the following formula (3):

$$\tilde{I}_s \approx K \cdot T \cdot D \cdot K^{-1} \cdot I_t \tag{3}$$

where $\tilde{I}_s$ means a projected video frame obtained by projecting a video frame sample (such as a key frame sample) $I_t$ onto another video frame sample $I_s$. K is an internal reference matrix, T is the estimated sample pose information of the video frame sample $I_t$, and D is depth information of the video frame sample $I_t$.

In addition, in formula (2), $l_p$ represents the similarity error, α is an empirical value, such as 0.85, and SSIM(*) is a function used for calculating a structural similarity error.

Then, the first loss function is obtained by calculating a weighted sum of the geometric error and the similarity error of the video frame samples.

During the training, model parameters of the first network model are updated based on the first loss function and the first sample data set. When the training meets a first end condition, the first network model with updated model parameters is used as the first target model.

The first end condition may be set based on actual needs. For example, the first end condition may be that a number of training times reaches a time threshold. The time threshold may be set based on actual needs.

In this embodiment of this application, the first network model is trained based on the first sample data set to obtain the first target model. In application, the first target model performs processing based on the first video frame, the first estimated sparse depth map, the first estimated pose information, the second video frame, the second estimated sparse depth map, the second estimated pose information, and the target sparse depth map, to determine the first corrected sparse depth map and the first corrected pose information. In this way, efficiency of determining the first corrected sparse depth map and the first corrected pose information can be improved.

As an example of this application, another model training method is further provided. As an example but not a limitation, the method may be performed by an electronic device, or may be performed by another electronic device. In this case, after the another electronic device completes the model training, the finally obtained second target model is transmitted to the electronic device or the cloud for storage. The method may include the following contents.

901: Obtain a second sample data set.

The second sample data set includes a plurality of sets of second sample data, and each of the plurality of sets of second sample data includes a video frame sample sequence, a corrected sparse depth map sample and corrected pose information corresponding to each video frame sample in the video frame sample sequence, and a true dense depth map corresponding to each video frame sample.

As an example of this application, the video frame sample sequence is acquired by a mobile RGB camera.

In an embodiment, the corrected sparse depth map sample and the corrected pose information corresponding to each video frame sample may be obtained in a manner of determining the first corrected sparse depth map and the first corrected pose information.

In an embodiment, each video frame sample may be a key frame sample in a video frame sample sequence.

In an embodiment, the true dense depth map corresponding to each video frame sample is acquired by a depth camera that works synchronously with the RGB camera that acquires the video frame sequence, and the depth camera has excellent indicators. That is to say, the depth camera may obtain dense depth information, for example, the depth camera may adopt a VGA depth camera.

902: Train a to-be-trained second network model based on the second sample data set to obtain the second target model.

During implementation, an end-to-end network model is constructed, and the end-to-end network model is a second network model. In an embodiment, the second network model may be a U-net network. In another embodiment, the second network model may include, but is not limited to, a VGG network or a RESNET-50 network.

A second loss function is constructed, and the second loss function is used to describe a difference between a true value and an estimated value. In this embodiment, the true value is a true dense depth map, and the estimated value is a dense depth map estimated through the second network model. As an example of this application, the second loss function is constructed based on the geometric error between the true value and the estimated value, the similarity error of the video frame samples, and smoothness of a depth image. The similarity error of the video frame samples is used to describe a back-projection error of the pose information. The smoothness of the depth image may be understood as a constraint condition, so that the finally obtained dense depth map is smooth and no jump exists between pixels.

For example, the geometric error may be determined through formula (4):

$$l_d = \sum_i \text{mask}(d_i - \tilde{d}i) \tag{4}$$

where $l_d$ represents the geometric error, i represents the $i^{th}$ second sample data, $d_i$ represents the true value, and $\tilde{d}_i$ represents the estimated value.

Moreover, the similarity error of the video frame samples may be determined through formula (5):

$$l_p = \alpha\frac{1 - SSIM(\tilde{I}_S I_S)}{2} + (1-\alpha)\|\tilde{I}_S - I_S\| \tag{5}$$

where $\tilde{I}_s$ is determined through the following formula (6):

$$\tilde{I}_s \approx K \cdot T \cdot D \cdot K^{-1} \cdot I_t \tag{6}$$

where $\tilde{I}_s$ means a projected video frame obtained by projecting a video frame sample (such as a key frame sample) $I_t$ onto another video frame sample $I_s$. K is an internal reference matrix, T is the pose information of the video frame sample $I_t$, and D is depth information of the video frame sample $I_t$.

In formula (5), $l_p$ represents the similarity error, $\alpha$ is an empirical value, such as 0.85, and SSIM(*) is a structural similarity error, which is a function used for calculating the structural similarity error.

In addition, the smoothness of the depth image may be determined through the following formula (7):

$$l_s = \frac{1}{n}\sum_{i=1}^{n}(F(\nabla_x(e_i)) + F(\nabla_y(e_i))) \tag{7}$$

where $l_s$ represents smoothness of the depth image, n represents a number of samples, F(*) is a vector differential operator used for calculation, $\nabla_x$ represents calculation of a gradient in an x direction, $\nabla_y$ represents calculation of a gradient in a y direction, and $$e_i = \|d_i - \tilde{d}_i\|.$$

Then, the second loss function is obtained by calculating a weighted sum of the geometric error, the similarity error of the video frame samples, and the smoothness of the depth image.

During the training, model parameters of the second network model are updated based on the second loss function and the second sample data set. When the training meets a second end condition, the second network model with updated model parameters is used as the second target model.

The second end condition may be set based on actual needs. For example, the second end condition may be that a number of training times reaches a time threshold. The time threshold may be set based on actual needs.

In this embodiment of this application, the second network model is trained based on the second sample data set to obtain the second target model. In application, the first target model performs processing based on the first video frame, the first corrected sparse depth map, the first corrected pose information, the second video frame, the second corrected sparse depth map, and the second corrected pose information, to determine the dense depth map. In this way, efficiency of determining the dense depth map can be improved.

It should be understood that the sequence number of steps in the above embodiments does not mean the order of execution, and the order of execution of each process should be determined by its function and internal logic, and should not constitute any limitation on the implementation process of the embodiments of this application.

Figure 8:
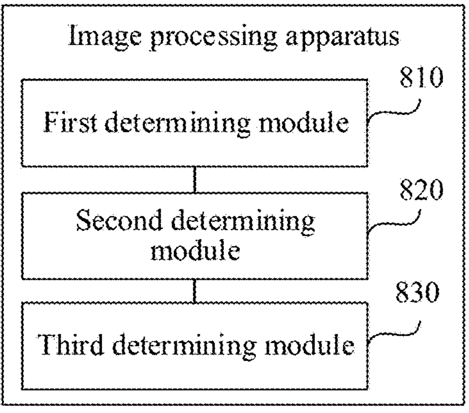
FIG. 8 is a schematic structural diagram of an image processing apparatus according to an embodiment of this application.

Corresponding to the image processing method described in the above embodiment, FIG. 8 is a structural block diagram of an image processing apparatus according to an embodiment of this application, and only parts related to this embodiment of this application are shown for convenience of description.

Referring to FIG. 8, the apparatus includes:

a first determining module 810, configured to determine a first estimated sparse depth map and first estimated pose information corresponding to a first video frame in a video frame sequence, where the video frame sequence is acquired by a mobile RGB camera;

a second determining module 820, configured to determine a first corrected sparse depth map and first corrected pose information corresponding to the first video frame based on the first video frame, the first estimated sparse depth map, the first estimated pose information, a second video frame of the video frame sequence before the first video frame, a second estimated sparse depth map and second estimated pose information corresponding to the second video frame, and a target sparse depth map that is synchronized with the first video frame and acquired by a depth camera; and a third determining module 830, configured to determine a dense depth map corresponding to the first video frame based on the first video frame, the first corrected sparse depth map, the first corrected pose information, the second video frame, and a second corrected sparse depth map and second corrected pose information of the second video frame.

As an example of this application, the second determining module 820 is configured to:

input the first video frame, the first estimated sparse depth map, the first estimated pose information, the second video frame, the second estimated sparse depth map, the second estimated pose information, and the target sparse depth map into a first target model for processing, and output the first corrected sparse depth map and the first corrected pose information, where the first target model is configured to determine a corrected sparse depth map and corrected pose information corresponding to any video frame based on the any video frame, an estimated sparse depth map and estimated pose information corresponding to the any video frame, another video frame located before the any video frame, an estimated sparse depth map and estimated pose information corresponding to the another video frame, and a sparse depth map that is synchronized with the any video frame and acquired by the depth camera.

As an example of this application, the second determining module 820 is further configured to:

obtain a first sample data set, where the first sample data set includes a plurality of sets of first sample data, and each of the plurality of sets of first sample data includes a sparse depth map sample acquired by the depth camera, a video frame sample sequence acquired by the RGB camera, an estimated sparse sample depth map and estimated sample pose information corresponding to video frame samples in the video frame sample sequence, a true sparse depth map sample, and true sample pose information; and train a to-be-trained first network model based on the first sample data set to obtain the first target model.

As an example of this application, the third determining module 830 is configured to:

input the first video frame, the first corrected sparse depth map, the first corrected pose information, the second video frame, the second corrected sparse depth map, and the second corrected pose information into a second target model for processing, and output the dense depth map, where the second target model is configured to determine a dense depth map corresponding to any video frame based on the any video frame, a corrected sparse depth map and corrected pose information corresponding to the any video frame, another video frame located before the any video frame, and a corrected sparse depth map and corrected pose information corresponding to the another video frame.

As an example of this application, the third determining module 830 is further configured to:

obtain a second sample data set, where the second sample data set includes a plurality of sets of second sample data, and each of the plurality of sets of second sample data includes a video frame sample sequence, a corrected sparse depth map sample and corrected pose information corresponding to each video frame sample in the video frame sample sequence, and a true dense depth map corresponding to each video frame sample; and train a to-be-trained second network model based on the second sample data set to obtain the second target model.

As an example of this application, the first video frame is a key frame, and the second video frame is a key frame.

As an example of this application, a plurality of second video frames are provided, and the second determining module 820 is further configured to:

determine the first corrected sparse depth map and the first corrected pose information based on the first video frame, the first estimated sparse depth map, the first estimated pose information, each of the plurality of second video frames, a second estimated sparse depth map and second estimated pose information corresponding to each second video frame, and the target sparse depth map.

As an example of this application, the third determining module 830 is further configured to:

determine the dense depth map based on the first video frame, the first corrected sparse depth map, the first corrected pose information, each second video frame, and a second corrected sparse depth map and second corrected pose information corresponding to each second video frame.

In this embodiment of this application, a first estimated sparse depth map and first estimated pose information corresponding to the first video frame in the video frame sequence are determined. The video frame sequence is acquired by a mobile RGB camera. A second sparse depth map synchronously acquired with the first video frame is obtained, and the second sparse depth map is acquired by a depth camera. A first corrected sparse depth map and first corrected pose information corresponding to the first video frame are determined based on the first video frame, the first estimated sparse depth map, the first estimated pose information, a second video frame in the video frame sequence before the first video frame, a second estimated sparse depth map and second estimated pose information corresponding to the second video frame, and a target sparse depth map that is synchronized with the first video frame and acquired by a depth camera. Since the first corrected sparse depth map and the first corrected pose information are determined based on a plurality of corrected sparse depth maps and corrected pose information from different angles and a target sparse depth map having depth information of an absolute dimension, the first corrected sparse depth map and the first corrected pose information are close to true values. Then a dense depth map corresponding to the first video frame is determined based on the first video frame, the first corrected sparse depth map, the first corrected pose information, the second video frame, a second corrected sparse depth map, and second corrected pose information. Since the first corrected sparse depth map and the first corrected pose information are more accurate, the second corrected sparse depth map and the second corrected pose information are also more accurate, and the first video frame and the second video frame are captured from different angles, a depth image having accurate and dense depth information can be finally obtained.

It can be clearly understood by those skilled in the art that for the convenience and conciseness of description, only the division of the above functional units and modules is used as an example for description. In practical application, the above functional allocation may be completed by different functional units and modules as required, that is, the internal structure of the device is divided into different functional units or modules to complete all or part of the functions described above. Functional units and modules in the embodiments may be integrated into one processing unit, or each unit may exist physically alone, or two or more units may be integrated into one unit. The integrated units can be implemented in the form of hardware or software functional units. In addition, specific names of functional units and modules are only for the convenience of distinguishing between each other, and are not used to limit the protection scope of this application. For specific work processes of the units and modules in the system, reference may be made to the corresponding processes in the foregoing method embodiments. Details are not described herein again.

In the foregoing embodiments, the descriptions of the embodiments have respective focuses. For a part that is not described in detail in an embodiment, reference may be made to related descriptions in other embodiments.

A person of ordinary skill in the art may be aware that, with reference to the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the embodiments provided in this application, it should be understood that the disclosed apparatus and method may be implemented in other manners. For example, the described system embodiment is merely an example. For example, the module or unit division is merely logical function division and may be another division during actual implementation. For example, a plurality of units or components may be combined or integrated into another system, or some features may be ignored or not performed. In addition, the displayed or discussed mutual couplings or direct couplings or communication connection may be implemented through some interfaces. The indirect coupling or communication connection between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on this understanding, all or some of the processes in the method of the foregoing embodiments may be implemented by a computer program instructing relevant hardware in this application. The computer program may be stored in a computer-readable storage medium. When the computer program is executed by a processor, steps of the foregoing method embodiments may be implemented. The computer program includes computer program code. The computer program code may be in the form of source code, object code, and an executable file, some intermediate forms, or the like. The computer-readable medium may include at least any entity or device capable of carrying computer program code to an electronic device, a recording medium, a computer memory, a read-only memory (read-only memory, ROM), a random access memory (random access memory, RAM), an electrical carrier signal, a telecommunication signal, and a software distribution medium, for example, a USB flash disk, a mobile hard disk, a magnetic disk, or an optical disk. In some jurisdictions, according to legislation and patent practice, the computer-readable medium cannot be the electrical carrier signal and the telecommunication signal.

Finally, it should be noted that: the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An image processing method, comprising:

determining a first estimated sparse depth map and first estimated pose information corresponding to a first video frame in a video frame sequence, wherein the video frame sequence is acquired by a mobile RGB camera;

determining a first corrected sparse depth map and first corrected pose information corresponding to the first video frame based on the first video frame, the first estimated sparse depth map, the first estimated pose information, a second video frame in the video frame sequence before the first video frame, a second estimated sparse depth map and second estimated pose information corresponding to the second video frame, and a target sparse depth map that is synchronized with the first video frame and acquired by a depth camera; and determining a dense depth map corresponding to the first video frame based on the first video frame, the first corrected sparse depth map, the first corrected pose information, the second video frame, and a second corrected sparse depth map and second corrected pose information of the second video frame.

2. The method according to claim 1, wherein the determining a first corrected sparse depth map and first corrected pose information corresponding to the first video frame based on the first video frame, the first estimated sparse depth map, the first estimated pose information, a second video frame in the video frame sequence before the first video frame, a second estimated sparse depth map and second estimated pose information corresponding to the second video frame, and a target sparse depth map that is synchronized with the first video frame and acquired by a depth camera comprises:

inputting the first video frame, the first estimated sparse depth map, the first estimated pose information, the second video frame, the second estimated sparse depth map, the second estimated pose information, and the target sparse depth map into a first target model for processing, and outputting the first corrected sparse depth map and the first corrected pose information, wherein the first target model is configured to determine a corrected sparse depth map and corrected pose information corresponding to any video frame based on the any video frame, an estimated sparse depth map and estimated pose information corresponding to the any video frame, another video frame located before the any video frame, an estimated sparse depth map and estimated pose information corresponding to the another video frame, and a sparse depth map that is synchronized with the any video frame and acquired by the depth camera.

3. The method according to claim 2, further comprising:

obtaining a first sample data set, wherein the first sample data set comprises a plurality of sets of first sample data, and each of the plurality of sets of first sample data comprises a sparse depth map sample acquired by the depth camera, a video frame sample sequence acquired by the RGB camera, an estimated sparse sample depth map and estimated sample pose information corresponding to video frame samples in the video frame sample sequence, a true sparse depth map sample, and true sample pose information; and training a to-be-trained first network model based on the first sample data set to obtain the first target model.

4. The method according to claim 1, wherein the determining a dense depth map corresponding to the first video frame based on the first video frame, the first corrected sparse depth map, the first corrected pose information, the second video frame, and a second corrected sparse depth map and second corrected pose information of the second video frame comprises:

inputting the first video frame, the first corrected sparse depth map, the first corrected pose information, the second video frame, the second corrected sparse depth map, and the second corrected pose information into a second target model for processing, and outputting the dense depth map, wherein the second target model is configured to determine a dense depth map corresponding to any video frame based on the any video frame, a corrected sparse depth map and corrected pose information corresponding to the any video frame, another video frame located before the any video frame, and a corrected sparse depth map and corrected pose information corresponding to the another video frame.

5. The method according to claim 4, further comprising:

obtaining a second sample data set, wherein the second sample data set comprises a plurality of sets of second sample data, and each of the plurality of sets of second sample data comprises a video frame sample sequence, a corrected sparse depth map sample and corrected pose information corresponding to each video frame sample in the video frame sample sequence, and a true dense depth map corresponding to each video frame sample; and training a to-be-trained second network model based on the second sample data set to obtain the second target model.

6. The method according to claim 1, wherein the first video frame is a key frame, and the second video frame is a key frame.

7. The method according to claim 1, wherein a plurality of second video frames are provided, and the determining a first corrected sparse depth map and first corrected pose information corresponding to the first video frame based on the first video frame, the first estimated sparse depth map, the first estimated pose information, a second video frame in the video frame sequence before the first video frame, a second estimated sparse depth map and second estimated pose information corresponding to the second video frame, and a target sparse depth map that is synchronized with the first video frame and acquired by a depth camera comprises:

determining the first corrected sparse depth map and the first corrected pose information based on the first video frame, the first estimated sparse depth map, the first estimated pose information, each of the plurality of second video frames, a second estimated sparse depth map and second estimated pose information corresponding to each second video frame, and the target sparse depth map.

8. The method according to claim 7, wherein the determining a dense depth map corresponding to the first video frame based on the first video frame, the first corrected sparse depth map, the first corrected pose information, the second video frame, and a second corrected sparse depth map and second corrected pose information of the second video frame comprises:

determining the dense depth map based on the first video frame, the first corrected sparse depth map, the first corrected pose information, each second video frame, and a second corrected sparse depth map and second corrected pose information corresponding to each second video frame.

9. An electronic device, comprising a display screen, a camera, and a processor, wherein the processor is coupled to a memory and configured to execute a computer program or instructions stored in the memory, to cause the electronic device to implement the following steps:

determining a first estimated sparse depth map and first estimated pose information corresponding to a first video frame in a video frame sequence, wherein the video frame sequence is acquired by a mobile RGB camera;

determining a first corrected sparse depth map and first corrected pose information corresponding to the first video frame based on the first video frame, the first estimated sparse depth map, the first estimated pose information, a second video frame in the video frame sequence before the first video frame, a second estimated sparse depth map and second estimated pose information corresponding to the second video frame, and a target sparse depth map that is synchronized with the first video frame and acquired by a depth camera; and determining a dense depth map corresponding to the first video frame based on the first video frame, the first corrected sparse depth map, the first corrected pose information, the second video frame, and a second corrected sparse depth map and second corrected pose information of the second video frame.

10. The electronic device according to claim 9, wherein the determining a first corrected sparse depth map and first corrected pose information corresponding to the first video frame based on the first video frame, the first estimated sparse depth map, the first estimated pose information, a second video frame in the video frame sequence before the first video frame, a second estimated sparse depth map and second estimated pose information corresponding to the second video frame, and a target sparse depth map that is synchronized with the first video frame and acquired by a depth camera comprises:

inputting the first video frame, the first estimated sparse depth map, the first estimated pose information, the second video frame, the second estimated sparse depth map, the second estimated pose information, and the target sparse depth map into a first target model for processing, and outputting the first corrected sparse depth map and the first corrected pose information, wherein the first target model is configured to determine a corrected sparse depth map and corrected pose information corresponding to any video frame based on the any video frame, an estimated sparse depth map and estimated pose information corresponding to the any video frame, another video frame located before the any video frame, an estimated sparse depth map and estimated pose information corresponding to the another video frame, and a sparse depth map that is synchronized with the any video frame and acquired by the depth camera.

11. The electronic device according to claim 10, further comprising:

obtaining a first sample data set, wherein the first sample data set comprises a plurality of sets of first sample data, and each of the plurality of sets of first sample data comprises a sparse depth map sample acquired by the depth camera, a video frame sample sequence acquired by the RGB camera, an estimated sparse sample depth map and estimated sample pose information corresponding to video frame samples in the video frame sample sequence, a true sparse depth map sample, and true sample pose information; and training a to-be-trained first network model based on the first sample data set to obtain the first target model.

12. The electronic device according to claim 9, wherein the determining a dense depth map corresponding to the first video frame based on the first video frame, the first corrected sparse depth map, the first corrected pose information, the second video frame, and a second corrected sparse depth map and second corrected pose information of the second video frame comprises:

inputting the first video frame, the first corrected sparse depth map, the first corrected pose information, the second video frame, the second corrected sparse depth map, and the second corrected pose information into a second target model for processing, and outputting the dense depth map, wherein the second target model is configured to determine a dense depth map corresponding to any video frame based on the any video frame, a corrected sparse depth map and corrected pose information corresponding to the any video frame, another video frame located before the any video frame, and a corrected sparse depth map and corrected pose information corresponding to the another video frame.

13. The electronic device according to claim 12, wherein when the computer program or instructions execute the computer instructions, the electronic device is enabled to further perform the following steps:

obtaining a second sample data set, wherein the second sample data set comprises a plurality of sets of second sample data, and each of the plurality of sets of second sample data comprises a video frame sample sequence, a corrected sparse depth map sample and corrected pose information corresponding to each video frame sample in the video frame sample sequence, and a true dense depth map corresponding to each video frame sample; and training a to-be-trained second network model based on the second sample data set to obtain the second target model.

14. The electronic device according to claim 9, wherein the first video frame is a key frame, and the second video frame is a key frame.

15. The electronic device according to claim 9, wherein a plurality of second video frames are provided, and the determining a first corrected sparse depth map and first corrected pose information corresponding to the first video frame based on the first video frame, the first estimated sparse depth map, the first estimated pose information, a second video frame in the video frame sequence before the first video frame, a second estimated sparse depth map and second estimated pose information corresponding to the second video frame, and a target sparse depth map that is synchronized with the first video frame and acquired by a depth camera comprises:

determining the first corrected sparse depth map and the first corrected pose information based on the first video frame, the first estimated sparse depth map, the first estimated pose information, each of the plurality of second video frames, a second estimated sparse depth map and second estimated pose information corresponding to each second video frame, and the target sparse depth map.

16. The electronic device according to claim 15, wherein the determining a dense depth map corresponding to the first video frame based on the first video frame, the first corrected sparse depth map, the first corrected pose information, the second video frame, and a second corrected sparse depth map and second corrected pose information of the second video frame comprises:

determining the dense depth map based on the first video frame, the first corrected sparse depth map, the first corrected pose information, each second video frame, and a second corrected sparse depth map and second corrected pose information corresponding to each second video frame.

17. A non-transitory computer-readable storage medium, storing a computer program, wherein the computer program, when executed on an electronic device, causes the electronic device to perform the following steps:

determining a first estimated sparse depth map and first estimated pose information corresponding to a first video frame in a video frame sequence, wherein the video frame sequence is acquired by a mobile RGB camera;

determining a first corrected sparse depth map and first corrected pose information corresponding to the first video frame based on the first video frame, the first estimated sparse depth map, the first estimated pose information, a second video frame in the video frame sequence before the first video frame, a second estimated sparse depth map and second estimated pose information corresponding to the second video frame, and a target sparse depth map that is synchronized with the first video frame and acquired by a depth camera; and determining a dense depth map corresponding to the first video frame based on the first video frame, the first corrected sparse depth map, the first corrected pose information, the second video frame, and a second corrected sparse depth map and second corrected pose information of the second video frame.

18. The non-transitory computer-readable storage medium according to claim 17, wherein the determining a first corrected sparse depth map and first corrected pose information corresponding to the first video frame based on the first video frame, the first estimated sparse depth map, the first estimated pose information, a second video frame in the video frame sequence before the first video frame, a second estimated sparse depth map and second estimated pose information corresponding to the second video frame, and a target sparse depth map that is synchronized with the first video frame and acquired by a depth camera comprises:

inputting the first video frame, the first estimated sparse depth map, the first estimated pose information, the second video frame, the second estimated sparse depth map, the second estimated pose information, and the target sparse depth map into a first target model for processing, and outputting the first corrected sparse depth map and the first corrected pose information, wherein the first target model is configured to determine a corrected sparse depth map and corrected pose information corresponding to any video frame based on the any video frame, an estimated sparse depth map and estimated pose information corresponding to the any video frame, another video frame located before the any video frame, an estimated sparse depth map and estimated pose information corresponding to the another video frame, and a sparse depth map that is synchronized with the any video frame and acquired by the depth camera.

19. The non-transitory computer-readable storage medium according to claim 18, wherein when the computer program or instructions execute the computer instructions, the electronic device is enabled to further perform the following steps:

obtaining a first sample data set, wherein the first sample data set comprises a plurality of sets of first sample data, and each of the plurality of sets of first sample data comprises a sparse depth map sample acquired by the depth camera, a video frame sample sequence acquired by the RGB camera, an estimated sparse sample depth map and estimated sample pose information corresponding to video frame samples in the video frame sample sequence, a true sparse depth map sample, and true sample pose information; and training a to-be-trained first network model based on the first sample data set to obtain the first target model.

20. The non-transitory computer-readable storage medium according to claim 17, wherein the determining a dense depth map corresponding to the first video frame based on the first video frame, the first corrected sparse depth map, the first corrected pose information, the second video frame, and a second corrected sparse depth map and second corrected pose information of the second video frame comprises:

inputting the first video frame, the first corrected sparse depth map, the first corrected pose information, the second video frame, the second corrected sparse depth map, and the second corrected pose information into a second target model for processing, and outputting the dense depth map, wherein the second target model is configured to determine a dense depth map corresponding to any video frame based on the any video frame, a corrected sparse depth map and corrected pose information corresponding to the any video frame, another video frame located before the any video frame, and a corrected sparse depth map and corrected pose information corresponding to the another video frame.

* * * * *